United States Patent [19]
Ziegenfus et al.

[11] 4,428,300
[45] Jan. 31, 1984

[54] VEHICLE PRECISION STOP ASSEMBLY

[75] Inventors: Barry L. Ziegenfus, Saylorsburg; Russell Scheel, Easton, both of Pa.

[73] Assignee: SI Handling Systems, Inc., Easton, Pa.

[21] Appl. No.: 330,353

[22] Filed: Dec. 14, 1981

[51] Int. Cl.³ .................... B61K 7/00; B61B 13/12
[52] U.S. Cl. ......................... 104/250; 104/166; 104/252; 198/345; 269/56; 414/750
[58] Field of Search ............ 104/165, 166, 249, 250, 104/252; 198/345; 414/749, 750; 269/56, 69; 29/33 P, 464, 559, 563

[56] References Cited

U.S. PATENT DOCUMENTS

| | | | |
|---|---|---|---|
| 3,213,996 | 10/1965 | Tech | 198/345 |
| 3,308,921 | 3/1967 | Bower | 198/345 |
| 3,858,626 | 1/1975 | Ribordy | 104/166 |
| 4,059,053 | 11/1977 | Jones | 104/166 X |
| 4,207,821 | 1/1980 | Beckert | 104/179 |
| 4,353,306 | 10/1982 | Rohrbach et al. | 104/166 |
| 4,356,904 | 11/1982 | Siarto | 198/345 |

FOREIGN PATENT DOCUMENTS 2717035 10/1978 Fed. Rep. of Germany ...... 104/252

Primary Examiner—Randolph Reese
Attorney, Agent, or Firm—Seidel, Gonda & Goldhammer

[57] ABSTRACT

A precision stop assembly is provided for causing a driverless vehicle to stop at a predetermined location with an accuracy ±0.005 inches in three planes. The assembly includes structure for slowing a vehicle down and then elevating the vehicle so that its support wheels lose contact with tracks while simultaneously guiding the vehicle to a precise orientation.

14 Claims, 7 Drawing Figures

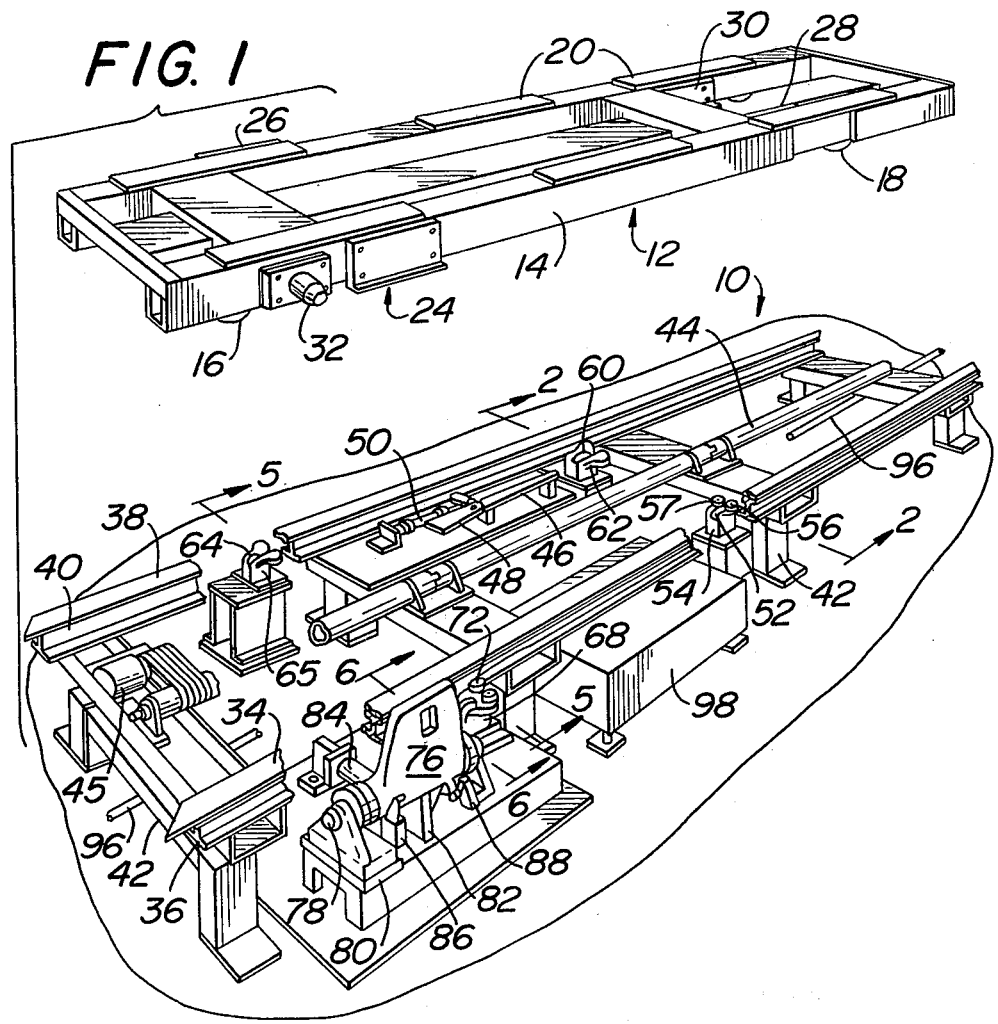

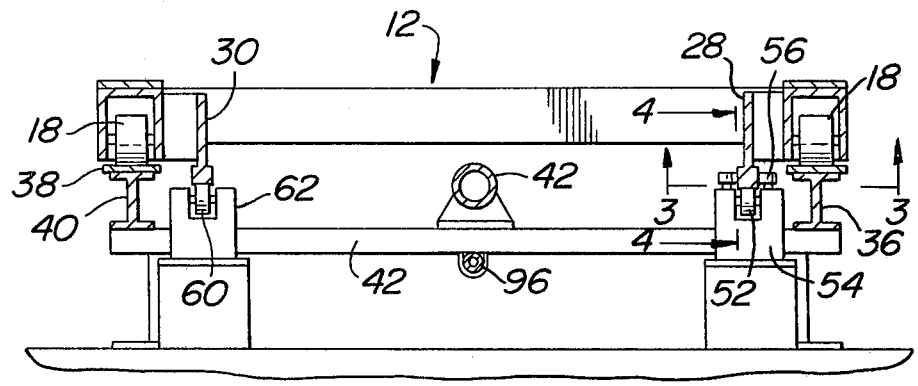
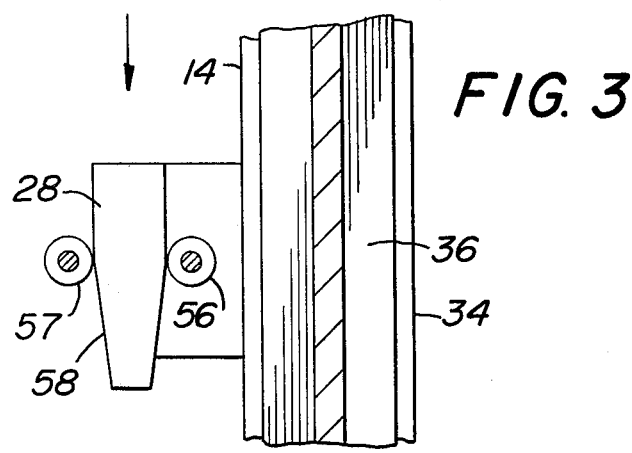
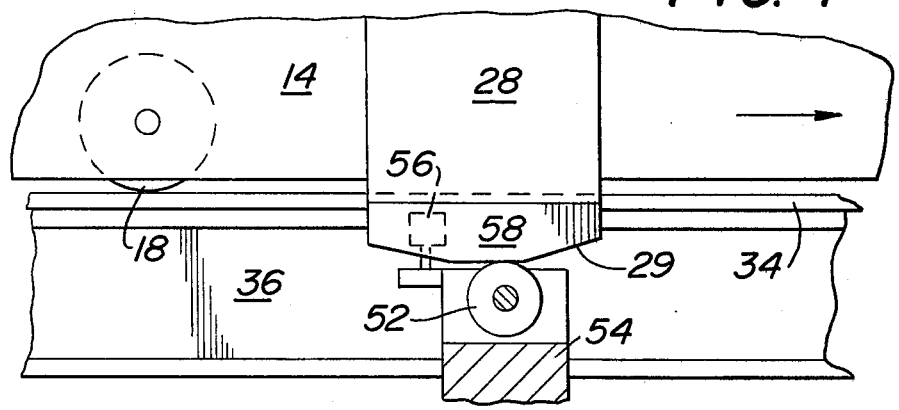

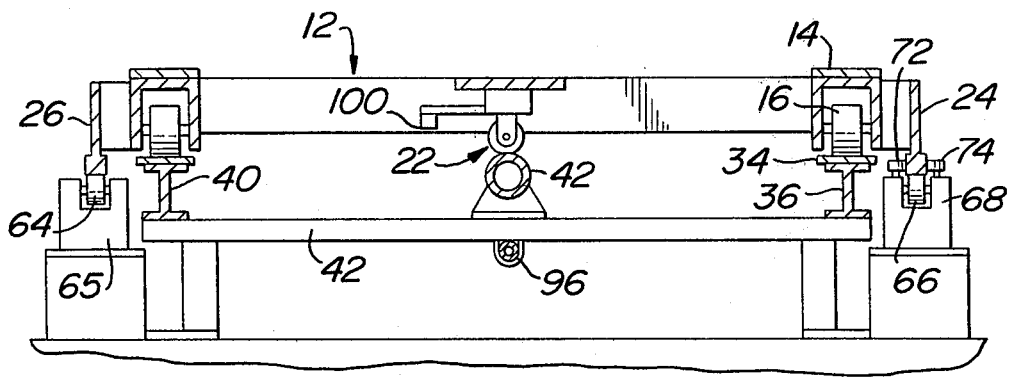
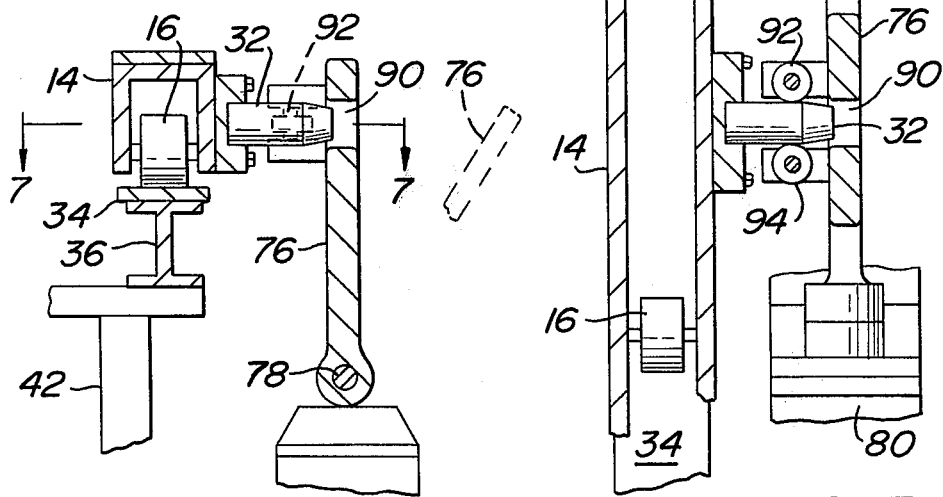

VEHICLE PRECISION STOP ASSEMBLY

BACKGROUND

The standard method for locating a driverless vehicle at a predetermined location is by means of a locating pin such as that illustrated in FIG. 15 of U.S. Pat. No. 3,858,626. A locating pin of that type has an accuracy of about 0.015 inches. In automated assembly line systems, there is a need for substantially greater accuracy. The problem solved by this invention is how to precisely cause a vehicle which may have a length of 10 to 15 feet stop at a location with accuracy of ±0.005 inches in three planes.

SUMMARY OF THE INVENTION

The present invention is directed to a precision stop assembly adapted to form part of a conveyor system for driverless vehicles. The assembly includes a frame supporting a drive tube between first and second tracks. A motor means is coupled to the drive tube for rotating the drive tube about its longitudinal axis. A means is provided for causing a driverless vehicle to stop at a predetermined location. At said location, there is provided a first means for elevating a vehicle front end so that support wheels on the vehicle are spaced from said tracks. At said location, there is provided a second means for elevating a vehicle rear end so that support wheels thereon are spaced from said tracks.

The aforesaid first and second means are differently spaced from said tracks so that each only contacts its associated end of a vehicle. Latch means are provided for selectively latching a portion of a driverless vehicle in a predetermined fore-aft position while the vehicle is in said elevated position.

It is an object of the present invention to provide a novel vehicle precision stop assembly for causing a vehicle to stop with precision at a predetermined location and which includes elevating a vehicle so that its support wheels are spaced from the track therebelow.

It is another object of the present invention to provide a stop assembly for causing a driverless vehicle to stop with accuracy of ±0.005 inches.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 1 is an exploded view showing a driverless vehicle and a precision stop assembly module in accordance with the present invention.

FIG. 2 is a sectional view taken along the line 2—2 in FIG. 1.

FIG. 3 is a sectional view taken along the line 3—3 in FIG. 2.

FIG. 4 is a sectional view taken along the line 4—4 in FIG. 2.

FIG. 5 is a sectional view taken along the line 5—5 in FIG. 1.

FIG. 6 is a sectional view taken along the line 6—6 in FIG. 1.

FIG. 7 is a sectional view taken along the line 7—7 in FIG. 6.

DETAILED DESCRIPTION

Referring to the drawings in detail, wherein like numerals indicate like elements, there is shown in FIG. 1 a precision stop assembly module in accordance with the present invention designated generally as 10 and a driverless vehicle designated generally as 12. The stop assembly module 10 is one part of an endless conveyor along which the vehicle 12 may move.

The vehicle 12 includes a rectangular frame 14 having front support wheels 16 and rear support wheels 18. The top surface of the frame 14 is provided with tooling subplates 20. The subplates 20 facilitate precision location of work to be acted on by automatic equipment at work stations along the length of the conveyor. The vehicle 12 includes a drive wheel assembly 22 (see FIG. 5) and preferably includes means for causing the vehicle to accumulate when it contacts another vehicle in front of it while moving along the conveyor. Such means for causing accumulation as well as the drive wheel assembly 22 may be of the type as disclosed in U.S. Pat. No. 3,818,837.

The vehicle 12 is provided with front precision pad members 24 and 26 adjacent the front end of the vehicle and on the outside of the frame 14. The vehicle 12 is also provided with rear precision pad members 28, 30 adjacent the rear wheels 18. Members 28, 30 are on the inside of the frame 14. It is important that the pad members on one side of the frame, such as members 24 and 28, are not aligned with one another. Members 28 and 30 are shown on the inside of the frame in FIG. 2. Members 24 and 26 are shown on the outside of the frame in FIG. 5. At any desirable location, but preferably adjacent the front end, the vehicle 12 is provided with a fore-aft locator pin member 32 on the outside of the frame 14.

The module 10 includes a track 34 on a rail 36 along one side thereof and a track 38 on a rail 40 on the other side thereof. The rails 36, 40 are supported by a frame designated generally as 42. The frame includes spaced frame segments including a horizontally disposed beam supported by upright legs. The number of beams and legs varies with the length of the module 10. A drive tube 44 is disposed between the tracks 34, 38 and is supported by the horizontally disposed beams of the frame 42. Drive tube 44 is rotated about its longitudinal axis by a motor 45 having its output pulley coupled to the drive tube 44 by endless belts.

A means is provided for causing a vehicle to stop at a predetermined location along the length of the module 10. Such means includes a first stationary cam 46 and a second cam 48. Cam 48 is movable between an operative and inoperative position. In its operative position, cam 48 forms an extension of the cam 46. Cam 48 is moved between operative and inoperative positions by a actuator preferably in the form of a pneumatic cylinder 50. Cylinder 50 has a piston rod coupled to the center of a toggle linkage for moving the cam 48.

An elevating means is provided on the module 10 for elevating the rear end of the vehicle 12 at a predetermined location. See FIG. 2. Such means includes a roller 52 mounted on a support between the rails 36, 40. Roller 52 is adapted to cooperate with pad members 28. See FIG. 4 wherein the bottom surface 29 on the pad member 28 is in rolling contact with roller 52. Bottom surface 29 is preferably tapered at the front and rear with a flat therebetween as shown in FIG. 4. The support for roller 52 has extensions projecting upstream. The projections support a pair of guide rollers 56, 57 which rotate about a vertical axis. The downstream end 58 of pad member 28 is tapered on its side faces as shown more clearly in FIG. 3 so that it may pass between the rollers 56, 57 which guide the vehicle 10 in a transverse direction with respect to the module 10. Any misalignment of the vehicle 12 with respect to the roller 52 will be accommodated by the rollers 56, 57.

A roller 60 is provided on a support 62 between the rails 36, 40 for rolling contact with a tapered surface on the bottom of pad member 30. The support 62 does not include guide rollers comparable to rollers 56, 57. See FIGS. 1 and 2. The rollers 52 and 60 cooperate to elevate the rear end of the vehicle 12. In FIG. 4, the vehicle 12 is shown elevated whereby the rear support wheels 18 are elevated a short distance up to ⅛ inch from top surface of the tracks 34, 38.

A similar means is provided for simultaneously elevating the front end of the vehicle 12. Thus, a roller 64 is rotated about a horizontal axis on the support 65. Support 65 is on the opposite side of rail 40 with respect to the support 62. Compare FIGS. 2 and 5. Roller 64 is adapted to cooperate with a tapered bottom surface on the pad member 26. A roller 66 is supported by the support member 68 to the right of rail 36. See FIGS. 1 and 5. Member 68 is provided with extensions projecting upstream and supporting guide rollers 72, 74. Rollers 72, 74 cooperate with tapered sides on the pad member 24 in the same manner as illustrated in FIG. 3. The spacing between rollers 60, 64 corresponds to the center spacing between the pad members 30, 26, respectively. The spacing between rollers 52, 66 corresponds to the center spacing between pad members 28 and 24, respectively. Hence, when the vehicle 12 is caused to come to a stop by the cam 48, the vehicle 12 will be elevated by the rollers 52, 60, 64 and 66. At the same time, the transverse position of the vehicle 12 with respect to the module 10 will have been accurately positioned by the guide rollers 56, 57, 72 and 74.

A mechanism is provided for adjusting the fore-aft position of the vehicle 12 while elevated by rollers described above. Such mechanism includes a plate member 76 having a horizontally disposed shaft 78 parallel to the rail 36 and to the right thereof in FIG. 1. Shaft 78 is supported by bearings on bracket 80. A bracket 82 depends from the plate member 76 and is pivotably connected to the piston rod associated with cylinder 84. Hence, cylinder 84 pivots the plate member 76 about a longitudinally extending axis corresponding to shaft 80 from an operative position as shown clockwise in FIG. 6 to an inoperative position as shown in phantom. Member 76 is provided with position limit switches 86, 88.

The plate member 76 is provided with a pair of guide rollers 92, 94 which rotate about vertical axes. The rollers 92, 94 are adapted to contact the tapered pin member 32 and adjust the fore-aft position of the vehicle 12 if there is any misalignment. An overtravel is provided by way of a hole 90 in the plate member 76.

An air supply conduit 96 is supported by the horizontal beams of the frame 42 beneath the elevation of the drive shaft 42. See FIGS. 1, 2 and 5. Conduit 96 supplies pressurized air for operating the cylinders 50, 84. All valves, switch contact members and other mechanisms are preferably housed within the housing 98.

Operation of the apparatus of the present invention is as follows. Vehicle 12 is transferred from an upstream module of the conveyor system onto the module 10 by frictional contact between the drive wheel assembly 22 and a drive tube corresponding to drive tube 44. The vehicle is then driven by the drive tube 44 which is driven by the motor 45. The vehicle 12 is slowed down by contact between cam follower 100 forming part of the drive wheel assembly 22 and the cam 46. Cam 46 causes the drive wheel assembly 22 to pivot about a vertical axis thereby causing the drive wheel to move toward an accumulation position. When cam follower 100 is in contact with the cam 48, the vehicle 12 will come to a stop. As the vehicle 12 comes to a stop, the rear end of the vehicle will be elevated by the rollers 52, 60 and the front end of the vehicle will be elevated by the rollers 64, 66.

Immediately preceding elevation of the vehicle 12, the vehicle will be shifted transversely if out of alignment by the rollers 56, 57, 72, 74. Also, the plate member 76 will be pivoted to the solid line position shown in FIG. 1 where the guide rollers 92, 94 will cooperate with the pin member 32 to adjust any misalignment with respect to the fore-aft position of the vehicle 12. When the plate member 76 is positioning the vehicle 12, switch 86 is tripped and indicates to control circuitry not shown that the vehicle is in the desired position.

The drive tube 44 will continue to rotate about its longitudinal axis. Drive wheel assembly 22 remains in contact with drive tube 44. The vehicle 12 will remain stationary on the rollers in its elevated position wherein the front wheel 16 and rear wheels 18 are spaced by a small distance from the top surface of their respective tracks 34, 38. At this point in time, the work supported by subplates 20 on the vehicle 12 will be inspected, machined, welded, etc. Thereafter, either manually or due to a timer, the cylinder 84 will move the plate member to the phantom position. Switch 88 is tripped by plate member 76 thereby enabling cylinder 50 to cause the cam 48 to lose contact with the cam follower 100. Thereafter, the drive assembly 22 will pivot under spring pressure to a drive position and due to frictional contact with drive tube 44 will drive the vehicle 12 off the rollers 52, 60, 64 and 66. Thereafter, the front wheels 16 and rear wheels 18 will be in rolling contact with their respective tracks 34, 38.

The vehicle precision stop assembly of the present invention first guides the vehicle 12 transversely of the tracks, then elevates the vehicle 12, then adjusts the fore-aft position of the vehicle. Each of the rollers 56, 57, 72, 74, 92 and 94 is preferably provided with an eccentric mounting facilitating minor adjustment of the rollers for precision positioning whereby accuracy of 0.005 inches may be attained in positioning the vehicle 12. The ease of fore-aft adjustment is facilitated by the vehicle 12 being supported on the rollers 52, 60, 64 and 66.

The present invention may be embodied in other specific forms without departing from the spirit or essential attributes thereof and, accordingly, reference should be made to the appended claims, rather than to the foregoing specification, as indicating the scope of the invention.

We claim:

1. A vehicle precision stop assembly comprising a frame supporting a drive tube between spaced tracks, motor means coupled to said tube for rotating said tube about its longitudinal axis, first means for elevating the vehicle front end so that support wheels thereon are spaced from said tracks, second means for elevating a vehicle rear end so that support wheels thereon are spaced from said tracks, said first and second elevating means being differently spaced from said tracks so that each only contacts its associated end of a vehicle, latch means for selectively latching a portion of a vehicle in a predetermined fore-aft position while the vehicle is in said elevated position, and means for causing a vehicle to stop while in contact with said first and second elevating means.

2. A stop assembly in accordance with claim 1 including means for guiding a vehicle in a transverse direction relative to the tracks before the vehicle contacts said elevating means, said guiding means being disposed only along one of said tracks and upstream of said elevating means.

3. A stop assembly in accordance with claim 1 including a driverless vehicle having a discrete tapered pad member for contact with each of said first and second elevating means, a drive wheel assembly on said vehicle in frictional contact with said drive tube, said vehicle having front and rear support wheels for rolling contact with said tracks.

4. A stop assembly in accordance with claim 3 wherein each pad member is tapered on a bottom face and on side faces thereof.

5. A stop assembly in accordance with claim 3 wherein said portion of the vehicle is a tapered pin extending horizontally along one side of the vehicle.

6. A stop assembly in accordance with claim 1 wherein said latch means includes a locator plate member having a pair of rollers for embracing said portion of a vehicle in an operative position, said plate member being movable to an inoperative position.

7. A stop assembly in accordance with claim 1 wherein each elevating means includes a roller rotatable about a horizontal axis.

8. A stop assembly in accordance with claim 7 wherein the elevating means associated with only one of said tracks includes guide rollers upstream therefrom for guiding contact with a pad member on a vehicle.

9. A vehicle precision stop assembly comprising a frame supporting a drive tube between spaced tracks, motor means coupled to said tube for rotating said tube about its longitudinal axis, means for causing a vehicle to stop at a predetermined location along said track, means for guiding a vehicle transversely of the tracks while the vehicle is being slowed down by said stopping means, first means downstream from said guide means for elevating a vehicle front end so that support wheels thereon are spaced from said tracks, second means upstream from said guide means for elevating a vehicle rear end so that support wheels thereon are spaced from said tracks, and latch means for selectively latching a portion of a vehicle in a predetermined fore-aft position while the vehicle is in said elevated position.

10. A stop assembly in accordance with claim 9 wherein each elevating means and said latch means includes rollers for contact with a portion of a vehicle.

11. A stop assembly in accordance with claim 9 wherein said tracks are disposed between said first means, and second means being disposed between said tracks.

12. A stop assembly in accordance with claim 11 including a driverless vehicle having support wheels in rolling contact with said tracks, said vehicle having a discrete tapered pad member for contact with each of said first and second means, said vehicle having a drive wheel assembly which remains in contact with said drive tube in the elevated position of said vehicle.

13. A stop assembly with claim 9 wherein each of said first and second elevating means is comprised of two parts, the distance between the parts of said first means being different from such distance for the parts of said second means so that each elevating means only contacts its associated end of a vehicle.

14. A driverless vehicle stop assembly comprising means for controlling the speed of a driverless vehicle as it moves along a track, said means including first and second cams for causing a drive wheel on a vehicle to move from a drive position toward an accumulation position, said first cam being stationary, said second cam in a first position thereof forming an extension of the cam surface of said first cam, a motor coupled to said second cam for pivoting said second cam from its first position to a position which will enable a vehicle to accelerate, and a motor operated latch moveable between an operative position wherein a vehicle is prevented from moving and an inoperative position wherein the latch does not interfere with movement of a vehicle.

* * * * *